May 24, 1966      V. R. PRING      3,252,322
VEHICLE FUEL METERING SYSTEM
Filed Feb. 13, 1963      2 Sheets-Sheet 1
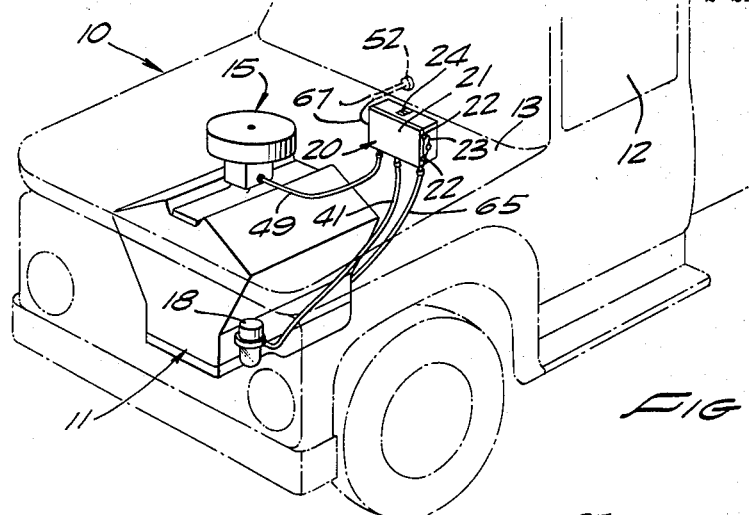
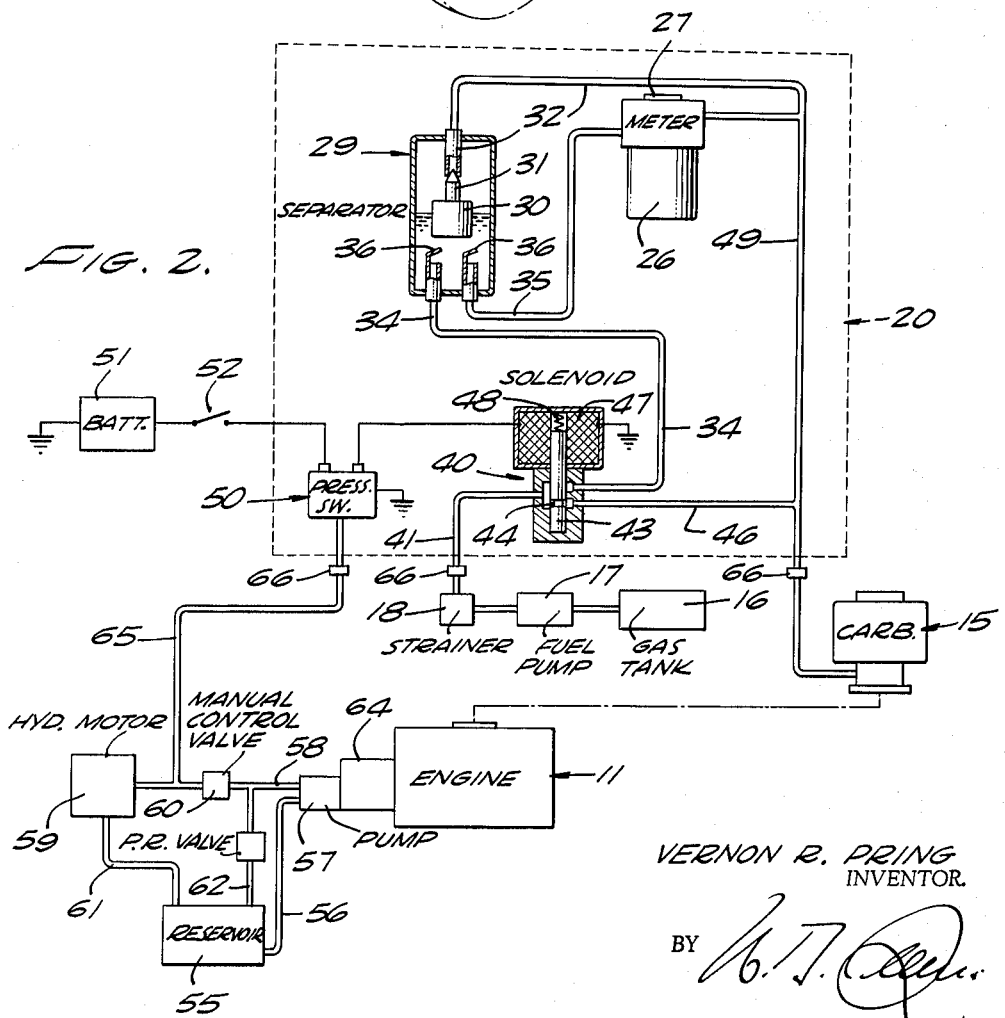
VERNON R. PRING
INVENTOR.
BY
ATTORNEY May 24, 1966  V. R. PRING  3,252,322
VEHICLE FUEL METERING SYSTEM
Filed Feb. 13, 1963  2 Sheets-Sheet 2
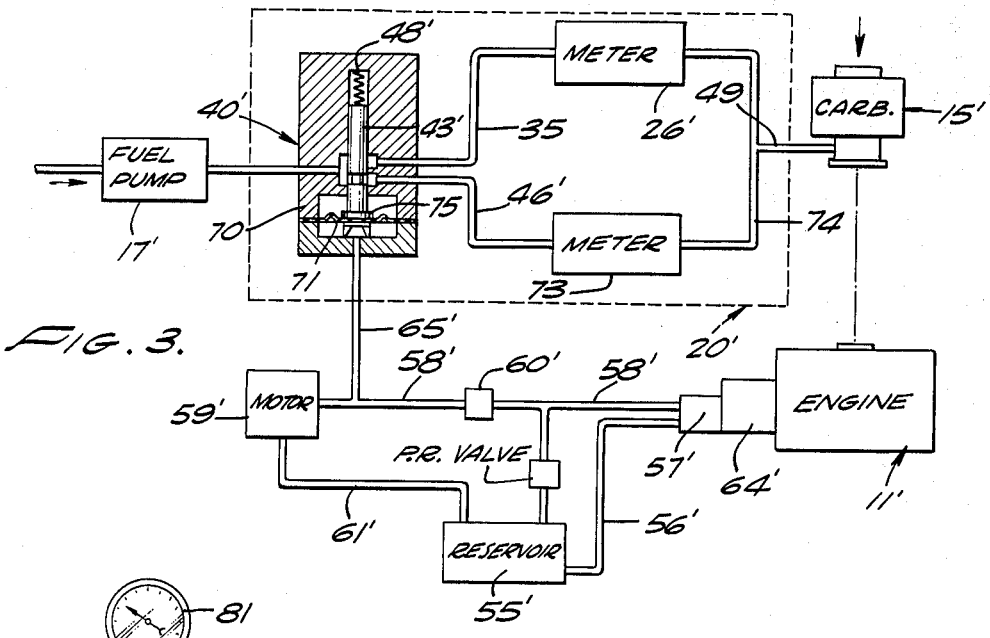
FIG. 3.
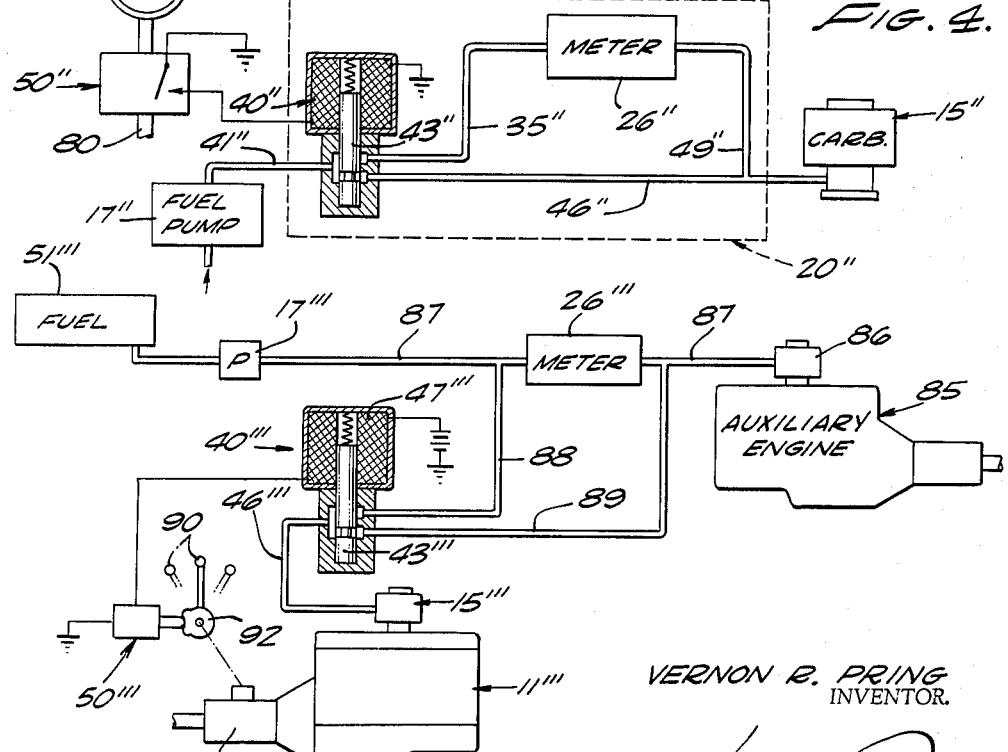
FIG. 4.
FIG. 5.
VERNON R. PRING
INVENTOR.
BY
ATTORNEY United States Patent Office 3,252,322
Patented May 24, 1966

3,252,322
VEHICLE FUEL METERING SYSTEM
Vernon R. Pring, 515 N. Elspeth, Covina, Calif.
Filed Feb. 13, 1963, Ser. No. 258,349
20 Claims. (Cl. 73—113)

The present invention relates to motor-propelled vehicles and more particularly to a unique fuel feeding system embodying means for measuring the quantity of fuel consumed by the propelling engine while operating for purposes other than to propel the vehicle and including engine idling as well as supplying power to auxiliaries.

Today large volumes of fuel are consumed by trucks and other vehicles to provide power for other than propulsion of the vehicle. Only such fuel as is consumed by the vehicle while being propelled along the highway is actually subject to certain taxes imposed to aid in defraying the cost of highway construction and maintenance. Owing to the lack of any provision for distinguishing between quantities of fuel used to propel the vehicle and those used for nonpropulsion purposes, it is the present practice to pay tax on all fuel consumed by the vehicle engine irrespective of the purposes served.

It is an object of the present invention to provide an improved tamperproof fuel supply system for motor vehicles having means responsive to an operating condition of the vehicle capable of distinguishing automatically between propelling and non-propelling use of the vehicle engine to activate fuel metering facilities thereby enabling the owner to make verified and authentic claim for tax refund on quantities of fuel not properly subject to taxation under the law. All components employed in controlling the flow of fuel to either the main truck engine or any auxiliary engine thereon and for measuring the fuel so consumed for non-propelling purposes are housed in a tamperproof casing having provision for inspection only by authorized persons and provision for readout of the fuel consumed for nonpropelling purposes.

The fuel metering system is adapted to be applied to vehicles of various types including those having but a single motor for supplying both propelling and power for auxiliary units as well as other vehicles having a vehicle propelling engine and one or more auxiliary engines for use in driving other components carried by or associated with the operation of the vehicle. Operation of the fuel metering facilities may be controlled in various ways within the scope of the present invention as, for example, by the operation or nonoperation of the vehicle drive shaft itself or by some component driven by the drive shaft. Alternatively, the operation of the metering facilities may be controlled by the operating condition of the power takeoff or of the auxiliary components. Still another mode of control is responsive to means conditioning the vehicle for propulsion as well as for parking, as will be explained presently. Certain types of conventional auxiliaries or the power takeoff therefor are operable only while the main drive shaft of the vehicle is disengaged; in this case, the fuel metering control may be responsive to the operation of the power takeoff. In vehicles having separate engines to operate auxiliaries, provision is made in the present invention for metering all fuel supplied to such auxiliaries as well as for metering fuel supplied to the main vehicle engine when not in use to propel the vehicle.

Accordingly, it is a primary object of the present invention to provide an improved fuel supply system for motor vehicles having means for accurately measuring fuel consumed by the vehicle but not subject to certain taxes as distinguished from fuel consumed and on which fuel tax is payable.

Another object of the invention is the provision of a vehicle fuel supply system having provision for distinguishing between fuel consumed by the vehicle to propel the same and fuel consumed for other purposes.

Another object of the invention is the provision of a simple, accurate and effective means of tamperproof character readily installable on motor-propelled vehicles either as new equipment or as an auxiliary equipment for an existing vehicle.

Another object of the invention is the provision of a motor vehicle having a fuel meter connected in parallel with the regular fuel supply for the engine including valve means selectively operable to supply fuel to the engine through the normal supply or through the metering facilities depending upon whether the vehicle is in motion or whether the engine is operating while the vehicle is standing still or not conditioned for propulsion.

Another object of the invention is the provision of a subassembly adapted to be readily inserted as a unit in the fuel supply facilities of a motor vehicle and containing tamperproof components automatically responsive to the propulsion or nonpropulsion of the vehicle to meter the fuel consumed during one of these conditions of vehicle operation.

These and other more specific objects will appear upon reading the following specification and claims and upon considering in connection therewith the attached drawings to which they relate.

Referring now to the drawings in which preferred embodiments of the invention are illustrated:

FIGURE 1 is a fragmentary general schematic view of a motor vehicle embodying a preferred embodiment of the present invention;

FIGURE 2 is a schematic view of the fuel supply per se according to the FIGURE 1 embodiment;

FIGURE 3 is a fragmentary schematic of a second preferred embodiment of the fuel supply system;

FIGURE 4 is a fragmentary view of a still further embodiment of the fuel supply system; and FIGURE 5 is a schematic view of still another preferred embodiment of the invention responsive to the position of a vehicle control component such as the transmission shift lever or the parking brake control lever.

Referring first more particularly to FIGURE 1, there is shown a conventional truck-type motor vehicle designated generally 10 equipped with a typical propelling engine 11 understood as coupled in known manner to the vehicle propelling wheels through the usual transmission and drive train assembly. This truck includes a driver's compartment 12 separated from the engine compartment by a fire wall 13. As herein indicated, air cleaner and carburetor assembly 15 is mounted atop the engine and closely adjacent the fuel intake manifold.

Referring now to FIGURE 2, it is pointed out that fuel from the usual tank 16 passes to fuel pump 17 through a filtering strainer 18 and would normally then flow directly to carburetor 15 for admixture with an appropriate quantity of combustion air. According to the present invention, however, the fuel leaves strainer 18 and passes to the inlet of a tamperproof sealed housing 20 here shown as mounted on fire wall 13 and enclosing important components of the present invention. Housing 20 may comprise a heavy-gauge metal box having a cover 21 normally held closed by cap screws 22 provided with suitable seal means preventing their removal, such a closed loop of wire 23 passing through transverse openings in two or more of these screws and provided with a metal seal between its ends. The interior of housing 20 is therefore understood as inaccessible to any except authorized persons. A window 24 overlies a readout device driven by the flow meter. This window is normally and preferably shielded by a protective cover through which the readout dial of the meter can be read.

Suitably mounted interiorly of housing 20 is any suitable accurate flow meter 26 having its readout device 27 immediately underlying window 24 of the housing. Positioned to one side of meter 26 within housing 20 is a liquid and air separator device 29. As here shown by way of illustration, this separator comprises a relatively small diameter, vertically disposed housing in which is a movably supported float 30 carrying a needle valve 31 disposed to close or open the inlet of an air escape conduit 32 passing through the separator wall. Opening upwardly through the bottom of housing 29 is a fuel inlet tube 34 and a fuel outlet conduit 35 each provided with an overlying protective guard 36 permitting free passage of liquid but not preventing float 30 from blocking flow through either conduit. Any air separating from the fuel is by-passed around meter 26 by conduits 32 and 49 thereby providing assurance against metering air.

Rigidly supported in another part of housing 20 is a three-way solenoid valve assembly 40 of any conventional type having an inlet conduit 41 projecting through the side wall of the housing for connection to fuel strainer 18. Valve spindle 43 has an annular groove 44 at all times in communication with the fuel inlet conduit 41. The opposite side of the valve spindle includes separated passages the lower one of which is in communication with outlet conduit 46 and the upper one of which is in communication with pipe 34 leading into the feul and air separator 29. So long as the solenoid coil 47 surrounding the upper or armature end of valve spindle 43 remains de-energized, spring 48 is effective to hold valve 43 in its lower position, as shown, wherein fuel flows directly to the carburetor through conduits 46, 49.

However, when coil 47 is energized it is effective to elevate valve spindle 43 in opposition to spring 48 to a position in which groove 44 communicates with outlet pipe 34 with the result that fuel then flows to separator 29 and thence through conduit 35 to fuel meter 26. Such fuel, after being metered, flows through conduit 49 along with any air escaping from the top of separator 29 and into carburetor 15.

Energization of solenoid coil 47 is automatically controlled in various ways and according to the use being made of engine 11. One suitable mode of control, shown in FIGURE 2 by way of illustration, makes use of a pressure responsive switch 50 mounted within sealed housing 20 and connected in circuit with solenoid coil 47 and with a source of power such as battery 51.

Desirably, a protective switch or the vehicle ignition switch 52 is connected in circuit with the pressure switch. As here shown, switch 50 is normally open except when subject to a suitable operating pressure. However, it will be understood that the switch may be designed to close in response to vacuum pressure conditions provided a change in the vacuum pressure is being employed to indicate whether the vehicle engine is operating to propel the vehicle or solely for other purposes.

As shown in FIGURE 2, pressure sensing portion of switch 50 is connected in circuit with the vehicle hydraulic power operating equipment with in turn is energized from the vehicle engine. The hydraulic system comprises a liquid reservoir 55 having an outlet conduit 56 connected with the inlet of a hydraulic pump 57 driven from engine 11. The outlet from this pump is connected through conduit 58 to any suitable hydraulic motor or cylinder 59. Conduit 58 is provided with a suitable control valve 60 for activating and deactivating motor 59. After being used in motor 59, the exhaust fluid is returned to reservoir 55 through conduit 61. The hydraulic system includes an excess return conduit 62 equipped with the usual pressure relief valve set to maintain a desired operating pressure in conduit 58. It is pointed out that hydraulic pump 57 is desirably arranged to be driven by the vehicle transmission 64 when any suitable control means, not shown, but well known in the art, is operated. Normally the pump can be engaged for driving only when the main drive shaft for the vehicle is disengaged from the engine. A portion of conduit 58 downstream from the control velve 60 includes a branch-off conduit 65 leading to pressure switch 50 and conveys the necessary pressure to close this switch. From the foregoing it will be apparent that switch 50 is closed only provided the manually controlled valve for the auxiliary hydraulically operated system is open and provided the power takeoff driving hydraulic pump 57 is engaged.

At this point it is pointed out that the components of the fuel system sealed within housing 20 require the connection of but three fluid conduits 41, 49 and 65. Each of these conduits includes a separable union coupling 66 located immediately exteriorly of housing 20. The only other connection passing into housing 20 is the single electrical conductor leading to pressure switch 50 and it is understood that this preferably includes a heavily armored flexible cable 67 (FIGURE 1) encasing the power supply between housing 20 and ignition switch 52.

The embodiment of the fuel metering system shown in FIGURE 3 is generally similar to that described above and for this reason the same reference characters distinguished by a prime are used to designate the same or functionally equivalent components. Principal differences include the use of a diaphragm-operated three-way valve 40' in lieu of a pressure-switch controlled solenoid valve 40 of the first described embodiment. Valve 40' is located within sealed housing 20' along with the structurally similar fuel meters 26', 73. Valve housing 70 reciprocally supports a valve 43' normally urged toward one of its two positions by spring 48'. The lower end of the valve is connected to a flexible diaphragm 71 having its rim clamped to housing 70 and one side of which is in communication through conduit 65' with the pressurized fluid supplied to hydraulic motor 59' through conduit 58'. So long as the operating control valve 60' for motor 59' is closed, spring 48' is effective to hold valve 43' in the position shown in FIGURE 3 wherein fuel from the pump 17' flows via pipe 46' through fuel meter 73 (identical in construction to meter 26) and thence through conduit 74 to carburetor 15'. No fuel passes through meter 26' because valve 43' is closed downwardly thereby blocking such flow. However, if the vehicle engine 11' is not being used to propel the vehicle but instead to operate hydraulic pump 57' to drive hydraulic motor 59', then the pressurized fluid in conduit 65' is effective on diaphragm 71 to shift valve 43' upwardly thereby closing off the flow to meter 73 and routing all fuel flow through conduit 35', fuel meter 26' and thence to carburetor 15' via conduit 49', backward flow through meter 73 and then being blocked by the upwardly closed valve 43'.

From the foregoing it is apparent that the FIGURE 3 embodiment avoids the need for a pressure switch to control operation of valve 40' by utilizing pressure present in the hydraulic system to operate this valve. Consequently, no electrical connection need be made to the sealed housing. It is also pointed out that the possibility of excess upward movement of valve stem 43' is avoided by the presence of a stop collar 75 on the lower end of the valve stem. The provision of axial protrusions on the lower end of the stem act similarly to limit downward valve movement. Another feature of the FIGURE 3 embodiment is the presence of the two metering devices which serve as a double check on the total fuel charged into the vehicle fuel tank and on the respective portions consumed to propel the vehicle and that consumed for other purposes. In other words, the sum of the readings obtained from the two meters 26′, 73 should correspond closely with the fuel charged into the vehicle tank. Additionally, the ratio of the fuel flowing through the two meters during a weekly or a monthly operating period should correspond roughly with past experience during the same period, if it does not then this fact requires a satisfactory explanation else the tax refund authorities may question the readings and claim for tax refund.

The FIGURE 4 embodiment differs in minor respects from that in FIGURE 2 and essentially in the fact that control switch 50″ for three-way solenoid valve 40″ remains open so long as the vehicle drive train assembly is rotating, as is true under the conditions illustrated in FIGURE 2. Whenever the vehicle drive train is not engaged and rotating switch 50″ closes thereby energizing solenoid valve 40″. Valve member 43″ is then shifted upwardly to direct the fuel flow to the engine carburetor 15″ through conduit 35″ and meter 26″.

As shown in FIGURE 4 by way of illustration, switch 50″ is inserted in the flexible drive shaft 80 leading to the vehicle speedometer 81. However, it will be understood that rotation-responsive switch 50″ may also be mounted to respond to any rotary part of the vehicle drive train or driven thereby including a power takeoff only when the vehicle is not being driven. In the latter event, the switch would be arranged to close only when the power takeoff is operating and the vehicle is not being propelled. In each arrangement it will be understood that fuel meter 26″ is connected to valve 40″ in such manner as to measure fuel consumed by the engine while operating but not actually propelling the vehicle.

FIGURE 5 shows still another embodiment suitable for use on vehicles of various types including in particular vehicles having an auxiliary engine to drive vehicle components of a type sometimes having need for power at times when it may not be expedient to operate the main engine. Examples of these include refrigerated cargo trucks having self-contained refrigerant systems operable continuously so long as refrigeration is required and irrespective of whether or not the truck is in transit or operating. Other examples may be mentioned as, for example, transit mixers for mixing and delivering concrete to the place of use. In such vehicles it is desirable to meter all fuel required by the auxiliary engine as well as that supplied to the vehicle engine when not actually driving the vehicle.

FIGURE 5 shows schematically how the present invention may be employed for these purposes, the components corresponding in structure and function to those described above in connection with FIGURES 1 to 4 being designated with the same reference characters distinguished by a triple prime. Auxiliary engine 85 will be understood as mounted on the vehicle and connectable by suitable clutch and drive mechanism to any component requiring power. Fuel is supplied to the engine carburetor 86 through a conduit 87 extending from the main fuel tank 51‴ and a fuel pump 17‴. Fuel meter 26‴ is located between the ends of conduit 87 and it will therefore be evident that all fuel consumed by the auxiliary motor 85 will be measured by the meter. Fuel consumed by vehicle engine 11‴ will also be measured if solenoid valve 40‴ is energized, this valve having its common passage connected through conduit 46‴ to carburetor 15‴ of the vehicle motor, whereas its separate inlet passages are connected to fuel conduit 87 on the opposite sides of the fuel meter by conduits 88 and 89. Coil 47‴ of the solenoid valve is connected in circuit with the vehicle battery or other power source and control switch 50‴. As shown, this switch is positioned to be closed by a cam 92 mounted on operating control 90 of the vehicle drive transmission 91. However, it will be understood that, if desired, the switch may be arranged to close as the vehicle parking brake control lever is released thereby shifting valve member 43‴ to the left to supply fuel to engine 11‴ through conduits 87, 88 and 46‴.

As shown in FIGURE 5, transmission 91 is disengaged and the vehicle is therefore at standstill. Accordingly the solenoid valve is de-energized so that valve member 43‴ is held in the position shown by its spring. Fuel then flows to engine 11‴ by way of conduit 87, meter 26‴, conduit 89, valve 40‴ and conduit 46‴. However, should the operator shift lever 90 out of its neutral position to engage transmission 91, cam 92 on the shift lever closes switch 50‴ energizing the solenoid and shifting valve member 43‴ to close off all fuel flow through conduit 89 and supplying fuel to the vehicle engine only by way of conduits 87, 88 and 46‴. In these circumstances meter 26‴ continues to meter all fuel flow to the auxiliary engine but not to the vehicle engine.

It will be understood that the terms meter, metering and metering means, as used in the claims herein, contemplate means for measuring and recording the quantity of fuel flowing therethrough to an engine serviced thereby.

While the particular vehicle fuel metering system herein shown and disclosed in detail is fully capable of attaining the objects and providing the advantages hereinbefore stated, it is to be understood that it is merely illustrative of the presently preferred embodiments of the invention and that no limitations are intended to the details of construction or design hereinshown other than as defined in the appended claims.

I claim:

1. In combination with a motor-propelled vehicle, a fuel system therefor having a fuel tank and means for supplying a regulatable mixture of fuel and air to the vehicle motor, that improvement which comprises means for measuring the quantity of fuel supplied to said motor under certain operating conditions, and means responsive to an operating condition of said vehicle while not being propelled to activate said fuel measuring means to measure fuel delivered to the vehicle motor and including means for de-activating said fuel measuring means while the motor is in use to propel the vehicle.

2. A motor vehicle having a motor-propelled chassis, means for supplying a regulatable combustible mixture of fuel and air to said motor, fuel metering means connected in circuit with said fuel supply means effective to measure the quantity of fuel flow therethrough, and means for activating and deactivating said fuel metering means automatically and in response to use of said motor to propel said chassis and effective to measure the quantity of fuel consumed by said motor so long as said motor is in operation but not in use to propel said chassis.

3. Fuel metering apparatus adapted to be used in a motor-propelled vehicle of the type having operator-regulated means for varying the quantity of a combustible mixture supplied to the motor thereof to meet operating requirements, said fuel metering apparatus comprising means for measuring the quantity of fuel consumed by said motor while the vehicle is stationary as distinguished from the quantity consumed while the vehicle is being propelled, and reversible control means for said fuel measuring means operable in response to an operating condition of said vehicle indicative of a change between the stationary and propelled condition thereof to change the operating condition of said fuel measuring means.

4. In a motor vehicle of the type having a motor-propelled chassis and means for supplying a combustible mixture of fuel and air thereto, that improvement which comprises selectively activatable fuel metering means connected in circuit with said first mentioned means and inoperable to meter fuel enroute to said motor while said vehicle is being propelled by the motor, said fuel metering means including control means responsive to an operating condition of said vehicle and effective to deactivate said fuel metering means to meter fuel delivered to the motor only so long as the motor is operating to propel said vehicle and effective to activate said fuel metering means when said vehicle is not being propelled by said motor.

5. The invention as defined in claim 4 characterized in the provision of normally sealed compartment means enclosing and concealing said fuel metering means to prevent tampering with said fuel metering means by unauthorized persons.

6. The invention as defined in claim 4 characterized in the provision of fuel and gas separator means connecting to said means for supplying fuel to said motor and operable to separate gas from fuel enroute to said fuel metering means and to supply only liquid fuel to said fuel metering means.

7. An automatic fuel metering accessory for use in combination with conventional fuel supply means of a motor-propelled vehicle of the type having power-operated means activated by the vehicle propelling motor, said accessory comprising first and second passage means for supplying fuel to said motor, flow control means operable to supply fuel selectively through either one or the other of said passages, fuel metering means positioned in said second passage for measuring all fuel flow therethrough, and control means for selecting one of said passages at a time to supply fuel to said motor and operatable automatically to position said flow control means to supply fuel to said second passage so long as the vehicle is not being propelled.

8. An automatic fuel metering accessory as defined in claim 6 characterized in that said fuel flow control means includes means responsive to a predetermined pressure difference to shift the flow of fuel from one to the other of said first and second passages depending upon pressure condition indicative of the use being made of the vehicle motor.

9. An automatic fuel metering accessory as defined in claim 8 characterized in the provision of pressure producing means adapted to be driven by the propelling motor of a vehicle when the motor is not being used to propel the vehicle.

10. An automatic fuel metering accessory adapted to be connected in circuit with the fuel supply of a motor-propelled vehicle and operable to measure the quantity of fuel consumed by the motor when not being used to propel the vehicle, said accessory comprising a housing normally sealed closed, first and second fuel passage means in said housing having a common inlet and a common outlet, reversible means for directing fuel flow from said inlet selectively into one or the other of said first and second passage means, fuel flow metering means located in one of said passage means, flow control means operable to route fuel flow selectively through and around said fuel metering means, means on said inlet and on said outlet accessible from the exterior of said housing for connecting the same into the fuel supply conduit of the motor of a motor-propelled vehicle, and means responsive to a condition of the vehicle indicative of the stationary condition thereof and effective on said flow control means to direct fuel flow through said metering means only so long as the vehicle remains stationary.

11. An automatic fuel metering accessory as defined in claim 10 characterized in that said reversible flow directing means comprises valve means normally positioned to supply fuel to the motor in a path bypassing said fuel metering means, and said means indicative of the stationary condition of the vehicle being operable to shift said valve means to a second position thereof wherein all fuel flow to said motor takes place through said fuel metering means.

12. The invention defined in claim 10 characterized in that said fuel metering means includes readout means readable from the exterior of said housing.

13. The invention defined in claim 12 characterized in that said housing and its contents are installable on a motor vehicle and removable therefrom as a unit and including disconnect means accessible from the exterior of said housing and by which said fuel inlet and outlet can be readily connected to and disconnected from the usual motor fuel supply conduit.

14. For use in a motor-propelled vehicle of the type having hydraulic power utilization means energized by pressurized fluid supplied by the vehicle propelling motor when not in use to propel the vehicle; that improvement which comprises means for measuring and distinguishing between the quantity of fuel consumed by the motor when the vehicle is stationary and the quantity consumed when the vehicle is being propelled by said motor, and pressure-sensitive means responsive to a change of pressure in said hydraulic power utilization means as the same is activated and deactivated and rendered effective thereby to change the fuel measuring condition of said fuel metering means.

15. In a motor-propelled vehicle of the type having an engine coupled to the vehicle drive wheels through transmission means having manually positioned means for conditioning said transmission means to drive and not to drive said vehicle, fuel supply means for said engine including fuel metering means and means for supplying fuel to said engine independently of said metering means, and means responsive to the position of said manually positioned means and effective to supply fuel to said engine selectively by way of said metering means when said transmission is not conditioned to transmit power to the vehicle drive wheels and to said engine independently of said metering means when said transmission is conditioned to propel said vehicle.

16. In a motor-propelled vehicle of the type having a plurality of independently operable fuel-consuming engines thereon including one to propel said vehicle through operator-controlled power coupling means and at least one other engine adapted to drive power-consuming means located on said vehicle, fuel supply means for all of said engines including recording fuel metering means, and means rendering said metering means effective to meter all fuel flowing to said engines when said vehicle propelling engine is not conditioned to propel said vehicle and for metering only the fuel flowing to said auxiliary engine means when the vehicle is being propelled by the vehicle propelling engine.

17. A motor vehicle as defined in claim 16 characterized in that said operator-controlled power coupling means includes means for conditioning the vehicle transmission means to propel the vehicle in the engaged position thereof and render the transmission means inoperative to propel the vehicle in the neutral position thereof, and further characterized in that said means for rendering said fuel metering means effective and ineffective to meter fuel to the vehicle engine includes shiftable valve means responsive to the operative and inoperative condition of the vehicle transmission means.

18. In a motor propelled vehicle having a fuel consuming engine to drive the same and including control means for conditioning the vehicle for propulsion and for non-propulsion by said engine, that improvement which comprises fuel supply means for said engine and including means for metering fuel flow to the engine at times and for supplying non-metered fuel to the engine at other times, and means operatively connected to said control means for selectively rendering said fuel metering means effective and ineffective to meter fuel flow depending on whether said vehicle is conditioned to be propelled by said engine or is not so conditioned.

19. The combination defined in claim 18 characterized in the provision on said vehicle of a second engine operable to drive an auxiliary component independently of the vehicle propelling engine, and means supplying fuel to said second engine through said fuel metering means whereby all fuel to said second engine is metered.

20. The combination defined in claim 18 characterized in that said control means is of the type having a plurality of operating positions in one of which the vehicle is conditioned for non-propulsion and parking and in a second of which the vehicle is conditioned for propulsion by said first mentioned engine.

References Cited by the Examiner

UNITED STATES PATENTS

| | | | |
|---|---|---|---|
| 1,477,489 | 12/1923 | Hough | 73—114 |
| 2,118,079 | 5/1938 | Goode et al. | 73—113 |
| 2,654,245 | 10/1953 | Hill | 73—133 X |
| 3,069,901 | 12/1962 | Freeman et al. | 73—114 |

LOUIS R. PRINCE, *Primary Examiner.*

RICHARD C. QUEISSER, *Examiner.*

MICHAEL B. HEPPS, *Assistant Examiner.*